United States Patent
Arbel et al.

(10) Patent No.: US 10,645,941 B2
(45) Date of Patent: May 12, 2020

(54) METHOD AND SYSTEM FOR TREATING A PRODUCT

(71) Applicant: The State of Israel, Ministry of Agriculture & Rural Development, Agricultural Research Organization (ARO) (Volcani Center), Rishon-LeZion (IL)

(72) Inventors: Avraham Arbel, Ramat-HaSharon (IL); Mordechai Barak, Mazkeret Batia (IL); Boaz Zion, Moshav Sitriya (IL); Yiftah Afgin, Rehovot (IL)

(73) Assignee: The State of Israel, Ministry of Agriculture & Rural Development, Agricultural Research Organization (ARO) (Volcani Center), Rishon-LeZion (IL)

( * ) Notice: Subject to any disclaimer, the term of this patent is extended or adjusted under 35 U.S.C. 154(b) by 0 days.

(21) Appl. No.: 15/518,492

(22) PCT Filed: Oct. 13, 2015

(86) PCT No.: PCT/IL2015/051020
§ 371 (c)(1),
(2) Date: Apr. 12, 2017

(87) PCT Pub. No.: WO2016/059633
PCT Pub. Date: Apr. 21, 2016

(65) Prior Publication Data
US 2017/0223975 A1    Aug. 10, 2017

Related U.S. Application Data

(60) Provisional application No. 62/062,976, filed on Oct. 13, 2014.

(51) Int. Cl.
*F25D 3/11* (2006.01)
*F25D 13/06* (2006.01)
(Continued)

(52) U.S. Cl.
CPC ............. *A23B 7/04* (2013.01); *A01G 7/02* (2013.01); *A01G 7/06* (2013.01); *A01G 9/143* (2013.01);
(Continued)

(58) Field of Classification Search
CPC .. F27B 11/00; F27B 1/00; F27B 9/243; F27B 9/28; F27D 7/06; F27D 2007/063;
(Continued)

(56) References Cited

U.S. PATENT DOCUMENTS 2,787,141 A * 4/1957 Michael ............. F25D 7/00
62/100
2,793,027 A * 5/1957 Matthey ............. C21D 9/005
266/132
(Continued)

FOREIGN PATENT DOCUMENTS

| CN | 103245216 | 8/2013 |
| CN | 103773939 | 5/2014 |

(Continued)

OTHER PUBLICATIONS

Supplementary European Search Report and the European Search Opinion dated May 25, 2018 From the European Patent Office Re. Application No. 15850905.9. (7 Pages).
(Continued)

*Primary Examiner* — Gregory A Wilson

(57) ABSTRACT

A vessel having an opening for receiving the product and walls surrounding the vessel at all sides except the opening. The interior of the vessel is filled with a fluid having a specific gravity lower than a specific gravity of a medium
(Continued)

surrounding the walls outside the vessel. While the vessel is oriented with the opening facing downwards, the vessel and/or product is/are conveyed to ensure that the product enters the interior through the opening.

12 Claims, 8 Drawing Sheets

(51) Int. Cl.

| | | |
|---|---|---|
| A23B 7/04 | (2006.01) | |
| F27B 9/02 | (2006.01) | |
| F27B 9/24 | (2006.01) | |
| A23L 3/02 | (2006.01) | |
| F27B 9/10 | (2006.01) | |
| F27D 3/00 | (2006.01) | |
| F27B 9/14 | (2006.01) | |
| A01G 9/14 | (2006.01) | |
| A01G 9/24 | (2006.01) | |
| A01G 7/02 | (2006.01) | |
| A01G 7/06 | (2006.01) | |
| A23L 3/04 | (2006.01) | |
| A23L 3/36 | (2006.01) | |
| F27B 9/12 | (2006.01) | |

(52) U.S. Cl.
CPC ............... *A01G 9/24* (2013.01); *A23L 3/02* (2013.01); *A23L 3/04* (2013.01); *A23L 3/361* (2013.01); *F27B 9/023* (2013.01); *F27B 9/10* (2013.01); *F27B 9/12* (2013.01); *F27B 9/142* (2013.01); *F27B 9/24* (2013.01); *F27D 3/0024* (2013.01); *A23V 2002/00* (2013.01); *Y02A 40/252* (2018.01); *Y02A 40/264* (2018.01)

(58) Field of Classification Search
CPC .. C21C 5/35; C21D 1/74; C21D 1/773; C21D 9/54; C21D 9/56; C21D 9/005; B65G 49/02; A21B 1/46; A21B 1/48; A21B 37/045; F25D 3/11; F25D 13/06; F25D 7/00
See application file for complete search history.

(56) References Cited

U.S. PATENT DOCUMENTS

| | | | |
|---|---|---|---|
| 3,722,866 A | 3/1973 | Herzberg | |
| 4,480,822 A * | 11/1984 | Mauratelli | C21D 9/46 266/249 |
| 4,480,922 A | 11/1984 | Mendenhall | |
| 4,955,209 A | 9/1990 | Smith | |
| 4,992,289 A | 2/1991 | Kiczek | |
| 5,432,319 A * | 7/1995 | Indig | A61C 13/20 118/725 |
| 5,522,237 A | 6/1996 | Wardle | |
| 5,860,282 A | 1/1999 | Liberman et al. | |
| 6,157,004 A | 12/2000 | Bizzio | |
| 6,672,098 B2 | 1/2004 | Norris | |
| 2009/0158975 A1* | 6/2009 | Cluzel | C21D 9/561 110/193 |

FOREIGN PATENT DOCUMENTS

| | | |
|---|---|---|
| EP | 1936000 | 6/2008 |
| GB | 1157373 | 7/1969 |
| JP | 02-125421 | 5/1990 |
| JP | 02-176392 | 7/1990 |
| RU | 1738230 | 6/1992 |
| RU | 2483571 | 6/2013 |
| WO | WO 2016/059633 | 4/2016 |

OTHER PUBLICATIONS

International Preliminary Report on Patentability dated Apr. 27, 2017 From the International Bureau of WIPO Re. Application No. PCT/IL2015/051020. (9 Pages).
International Search Report and the Written Opinion dated Jan. 21, 2016 From the International Searching Authority Re. Application No. PCT/IL2015/051020.
Communication Pursuant to Article 94(3) EPC dated Feb. 7, 2019 From the European Patent Office Re. Application No. 15850905.9. (4 Pages).
Office Action dated Jan. 9, 2020 From the Israel Patent Office Re. Application No. 251602 and its Translation into English. (7 Pages).

* cited by examiner

METHOD AND SYSTEM FOR TREATING A PRODUCT

RELATED APPLICATIONS

This application is a National Phase of PCT Patent Application No. PCT/IL2015/051020 having International filing date of Oct. 13, 2015, which claims the benefit of priority under 35 USC § 119(e) of U.S. Provisional Patent Application No. 62/062,976 filed Oct. 13, 2014. The contents of the above applications are all incorporated by reference as if fully set forth herein in their entirety.

FIELD AND BACKGROUND OF THE INVENTION

The present invention, in some embodiments thereof, relates to product treatment and, more particularly, but not exclusively, to method and system for thermal treatment of products, such as, but not limited to, agricultural products.

Various systems for heating or cooling have been devised over the past decades. U.S. Pat. No. 6,672,098 teaching a chiller comprising a vessel for coolant and an endless conveyor having transverse flights. The conveyor passes in a loop from one side to another of the vessel. An arrangement is provided to alter the path of the conveyor so as to shorten and lengthen the loop. In use, when the loop is lengthened articles are tumbled in the coolant, and when the loop is shortened, articles are conveyed out of the vessel.

U.S. Pat. No. 5,522,237 to Wardle teaching a U-shaped immersion freezer having an inlet and an outlet and an immersion zone filled with liquid refrigerant. The product to be frozen is passed into the freezer through the inlet and raised by at least one paddle member to the outlet. The resulting frozen product and some liquid refrigerant is then passed out of the outlet to a conveyor.

Chinese Patent CN103773939 teaching a high-efficiency aging oven, which comprises an oven body whose lower part is provided with a conveying chain, the top part of the oven body is provided with several circular drainage blowers which are opposite to the conveying chain, and the side walls of the oven body are respectively provided with burners and thermocouples. The invention is characterized in that the bottom of the circular drainage blower is equipped with a mounting rack, the bottom of the mounting rack is equipped with a hot air cycle distributor, the hot air cycle distributor comprises a fan housing, and the top of the fan housing is provided with an air inlet, and the air inlet is equipped with an arc shockproof connector, and the top of the arc shockproof connector is welded with a flange, the front and back sidewalls at the bottom of the fan housing are equipped with front and back support plates, and several parallelly arranged angle irons with interval are equipped between support plates, and trapezoid air outlets with wide upper part and narrow lower part are formed between two angle irons.

U.S. Pat. No. 2,793,027 to Matthey disclosing heat treatment of metal articles fed in procession at a suitable speed into and out of a furnace space defined at its base by a liquid seal through which the articles are admitted for heating to the required temperature and for the required time and through which also the articles are subsequently removed in cooled condition, the required atmosphere in the furnace being maintained by vaporization of the liquid constituting the seal and wetting the admitted articles, and such liquid being selected from a range of commercial solvents, paint thinners and the like which are oxygen-free and vaporise in the temperature conditions at which it is required to operate the furnace space. The furnace space is isolated from the atmosphere at its base by the liquid seal and at its upper part by a trap of the selected solvent or like liquid so arranged as, in response to pressure changes occurring in the said space as between high temperature operative and low temperature inoperative conditions in the furnace) to control the escape of vapours of the liquid to the atmosphere or to a condenser for subsequent return of the condensate to the sealing liquid container and the induction of nitrogen or other suitable neutral gas into the furnace space when the same is put out of operation, and also to provide for escape of such gas by displacement by the generated vapors when the space is heated for the annealing or like process.

CN103245216 teaches a closed cooling tower. The tower comprises a tower body, air inlets and an air outlet, the number of the air inlets is two, the air inlets are arranged at two sides of the tower body respectively, the air outlet is arranged at the top of the tower body, a fan is arranged in each of the air inlets, a water distribution system is correspondingly arranged in the tower body, a filler chamber is arranged in the tower body below the water distribution system, a radiating fin is arranged in the filler chamber, a heat exchange coiler assembly is arranged in the tower body below the filler chamber, the heat exchange coiler assembly comprises a liquid supply main tube, a returned liquid main tube and capillary tubes, two ends of the capillary tubes are communicated with the liquid supply main tube and the returned liquid main tube respectively, and the liquid supply main tube and the returned liquid main tube are communicated with the water inlets and the water outlet respectively. According to the invention, the cooling tower has a high cooling efficiency, and the radiating fin arranged in the filler chamber has a trapezoidal corrugated body increases the radiating effect and improves the heat exchange rate, and the heat exchange coiler assembly composed of the liquid supply main tube, the returned liquid main tube and the capillary tubes increases the heat exchange amount and improves the heat exchange performance.

RU2483571 teaches a toroidal apparatus for production of fruit and vegetable chips. The invention relates to food industry. The toroidal apparatus for production of fruit and vegetable chips includes a toroid-shaped sectional body positioned on a slanted surface, sectional working chambers installed in guides so that to enable movement on spherical wheel supports and equipped with buffers attached to the axles, loading and discharge bins, a steam conduit, moisturisers and a drive. The serially interconnected sections are positioned inside the toroid-shaped sectional body, such as: the raw material pre-heating section, a convective drying section, a preliminary hydrothermal treatment (PHTT) section (positioned between the UHF drying sections) and the dry product cooling section the convective drying section is equipped with a recirculation circuit for the heat medium supply, the PHTT section is equipped with moisturisers, a heat exchanger and a circulation pipeline with a pump, the UHF drying sections are connected, via the steam conduit, to the PHTT section for the liquid pre-heating and are equipped with UHF units having magnetrons (positioned inside the section in a successively alternating way), waveguides and antenna radiators. Before the first UHF drying section a trap is installed, the dried product cooling section is separated from the UHF drying section by a protective region having a rectangular cross-section and the guides before the discharge bin are arranged along a helical line so that to enable the sectional working chambers turnover relative to the torus ring cross-section axle without return to the initial position.

JPH02125421 teaches heat treatment apparatus to cope with various manufacturing steps and to improve productivity by manually operating a process control system on the basis of the display content of a gas flowing state display mechanism to process a material to be processed; and JPH02176392 teaches a heat treatment device to prevent bad affection due to the back-diffusion of operating oil.

SUMMARY OF THE INVENTION

According to an aspect of some embodiments of the present invention there is provided a method of treating a product. The method comprises: providing a vessel having an opening sized for receiving the product and walls surrounding the vessel at all sides except the opening, wherein an interior of the vessel is filled with a fluid having a specific gravity lower than a specific gravity of a medium surrounding the walls outside the vessel; and while the vessel is oriented with the opening facing downwards, conveying the vessel and/or the product to ensure that the product enters the interior through the opening.

According to some embodiments of the invention the fluid is at a temperature higher than a temperature outside the vessel.

According to some embodiments of the invention the method comprises heating the fluid before the product is introduced into the vessel.

According to some embodiments of the invention the heating is while the opening is facing downwards.

According to some embodiments of the invention the method comprises heating the fluid while the product is in the vessel.

According to some embodiments of the invention the method comprises, while the vessel is oriented with the opening facing downwards, conveying the vessel and/or the product to ensure that the product exits the interior through the opening.

According to an aspect of some embodiments of the present invention there is provided a system for heating a product. The system comprises: a vessel having an opening sized for receiving the product and walls surrounding the vessel at all sides except the opening, wherein an interior of the vessel is filled with a fluid; a heating device configured for heating the fluid to a temperature higher than a temperature outside the vessel; and a conveyor configured for conveying the vessel and/or the product to ensure that the product enters the interior through the opening, while the vessel is oriented with the opening facing downwards.

According to some embodiments of the invention the conveyor is also configured for conveying the vessel and/or the product to ensure that the product exits the interior through the opening, while the vessel is still oriented with the opening facing downwards.

According to some embodiments of the invention the vessel is static and the product is moved upwards into the interior.

According to some embodiments of the invention the product is static and the vessel is moved downwards to cover the product.

According to some embodiments of the invention the fluid is gas.

According to some embodiments of the invention the product is immersed in liquid.

According to some embodiments of the invention the product is immersed in liquid and the fluid is also liquid.

According to an aspect of some embodiments of the present invention there is provided a method of treating a product. The method comprises: providing a vessel having an opening sized for receiving the product and walls surrounding the vessel at all sides except the opening, wherein an interior of the vessel is filled with a fluid having a specific gravity higher than a specific gravity of a medium surrounding the walls outside the vessel; while the vessel is oriented with the opening facing upwards, conveying the vessel and/or the product to ensure that the product enters the interior through the opening, and to maintain a relative motion between the product and the vessel at least throughout the presence of the product is in the vessel; and conveying the vessel and/or the product to ensure that the product exits the interior through the opening.

According to some embodiments of the invention the fluid is at a temperature lower than a temperature outside the vessel.

According to some embodiments of the invention the method comprises cooling the fluid before the product is introduced into the vessel.

According to some embodiments of the invention the heating is while the opening is facing upwards.

According to some embodiments of the invention the method comprises cooling the fluid while the product is in the vessel.

According to some embodiments of the invention the method comprises, while the vessel is oriented with the opening facing upwards, conveying the vessel and/or the product to ensure that the product exits the interior through the opening.

According to an aspect of some embodiments of the present invention there is provided a system for cooling a product. The system comprises: a vessel having an opening sized for receiving the product and walls surrounding the vessel at all sides except the opening, wherein an interior of the vessel is filled with a fluid; a cooling device configured for cooling the fluid to a temperature lower than a temperature outside the vessel; and a conveyor configured for conveying the vessel and/or the product to ensure that the product enters the interior through the opening, while the vessel is oriented with the opening facing upwards, and to maintain a relative motion between the product and the vessel at least throughout the presence of the product is in the vessel.

According to some embodiments of the invention the conveyor is also configured for conveying the vessel and/or the product to ensure that the product exits the interior through the opening, while the vessel is still oriented with the opening facing upwards.

According to some embodiments of the invention the system comprises: an additional vessel having an opening for receiving the product and walls surrounding the vessel at all sides except the opening, wherein an interior of the vessel is filled with a fluid; and a heating device configured for heating the fluid to a temperature higher than a temperature outside the vessel; wherein the a conveyor is also configured for conveying the vessel and/or the product to ensure that the product enters the interior through the opening, while the vessel is oriented with the opening facing downwards.

According to some embodiments of the invention the vessel is static and the product is moved downwards into the interior.

According to some embodiments of the invention the product is static and the vessel is moved upwards to cover the product.

According to some embodiments of the invention the fluid is gas.

According to some embodiments of the invention the fluid is liquid.

According to some embodiments of the invention the product is immersed in liquid.

According to some embodiments of the invention the vessel has a tapered shape, and wherein the opening is at a wider side of the tapered shape.

According to some embodiments of the invention the walls are made of a material having a heat conductivity of less than 1 watt per meter per degree.

According to some embodiments of the invention at least one of a speed of a relative motion between the product and the vessel, and a length of a relative motion path traversed by the product within the vessel is selected so as to ensure that the product is within the vessel for a predetermined time period.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
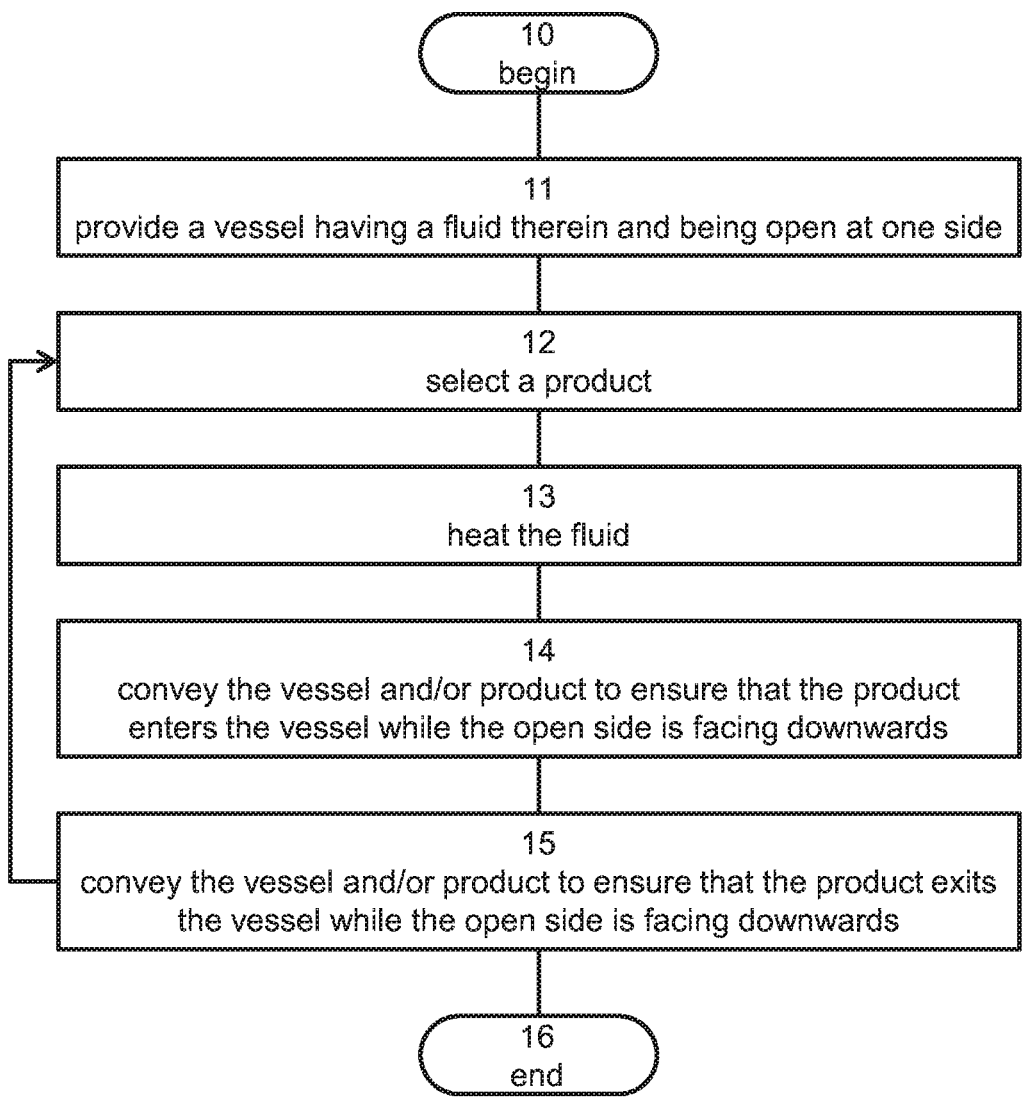
FIG. 1 is a flowchart diagram of a method suitable for treating a product, according to some embodiments of the present invention.

The present invention, in some embodiments thereof, relates to product treatment and, more particularly, but not exclusively, to method and system for thermal treatment of products, such as, but not limited to, agricultural products.

Conventional techniques for thermal treatment of products employ ovens with side openings through which the products are conveyed into and out of the oven. The present inventors found that through such openings there is a significant loss of energy. Other techniques employ washing and/or steaming protocols in which heated water is sprayed on the products while they are conveyed through a washing and/or steaming apparatus and drained out. It was found by the present inventors that this technique requires a considerable amount of energy. Even if the hot water is recycled, it loses a significant amount of energy to the environment and the treatment is not energy-efficient.

The present Inventors have therefore devised a technique for applying thermal treatment that is more energetically efficient than the above techniques.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Several embodiments of the present invention are described below with reference to flowchart diagrams. It is to be understood that, unless otherwise defined, the method operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Referring now to the drawings, FIG. 1 is a flowchart diagram of a method suitable for treating (optionally and preferably heating) a product, according to some embodiments of the present invention. The product is optionally and preferably an agricultural product, such as, but not limited to, as a whole-plant, a part of a plant, an isolated fruit, an isolated vegetable, an isolated flower and a seed. The product can also be a food product or industrial product (e.g., a textile product, a pharmaceutical product, an industrial food product, a leather product) or any other type of product that requires heating.

The method begins at 10 and continues to 11 at which a vessel is provided. The vessel optionally and preferably has an opening that is sized for receiving the product and walls surrounding the vessel at all sides except at the opening. The interior of the vessel is filled with a fluid (gas or liquid). At 12 a product is selected. Typically, but not necessarily, the product is one of a collection of products to which thermal treatment is to be applied.

The specific gravity of the fluid in the vessel is preferably lower than the specific gravity of the medium surrounding the walls of the vessel outside the vessel. For example, the fluid in the vessel can be at a temperature that is higher than the temperature outside vessel. Alternatively or additionally, the method can optionally and preferably heat the fluid in the vessel at 13. Preferably, the fluid is heated while the opening is facing downwards. This is energetically advantageous because the heated fluid moves upwards, so that when the opening is facing downwards, the heated fluid moves away from the opening into the vessel and is therefore trapped within the vessel. The fluid can be different from the fluid of the environment surrounding the vessel. For example, when the fluid of the environment surrounding the vessel is air, the fluid in the vessel can be water vapor. Another example is when the fluid of the environment surrounding the vessel is liquid, and the fluid in the vessel is gas.

As used herein "downwards" and "upwards" are directions that are generally (e.g., with deviation of 10° or less) parallel and anti-parallel to the direction of the terrestrial gravitational force, respectively.

The method optionally and preferably continues to 14 at which the vessel and/or product is conveyed to ensure that the product enters the interior of the vessel through the opening, while the vessel is oriented with the opening facing downwards. Maintaining the orientation such that the opening is facing down is advantageous because it reduces loss of heat to the environment. Specifically, when the opening is facing downwards, fluid having a temperature that is higher than the environment is prevented from exiting the vessel through the opening.

Operation 14 can be executed manually, or, more preferably using an automatic conveyor, as further detailed hereinbelow. The product can enter the vessel while being static, in which case the vessel is moved downwards to cover the product. These embodiments are particularly useful when it is difficult to convey the product itself, for example, when the product is heavier than the vessel, or when the product is connected to the ground (e.g., a tree having roots in the ground) or to any other non-movable support. Alternatively, the vessel can be static, in which case the product is moved upwards into the interior of the vessel. These embodiments are particularly useful when the product is movable, for example, when the product is not connected to a non-movable support (e.g., a whole plant grown in a movable pot, or a part of a plant). Also contemplated, are embodiments in which both the vessel and the product are conveyed towards each other.

While the product is in contact with the fluid in the interior of the vessel, the product absorbs heat from the fluid. This is because its temperature is lower than that of the fluid. As a result, the fluid may cools. In some embodiments, the heating 13 is continued while the product is in the vessel, to compensate for the fluid heat loss. Alternatively, heating 13 may be applied only after the product has entered the vessel, in which case 14 precedes 13.

The method optionally and preferably continues to 15 at which the vessel and/or product is conveyed to ensure that the product exits the interior of the vessel through the opening, while the vessel is oriented with the opening facing downwards. Operations 15 and 14 are preferably executed using the same technique. Specifically, when the vessel is static at 14 it is also static at 15, and when the product is static at 14 it is also static at 15.

From 15 the method can optionally and preferably loop back to 12 for selecting another product from the collection and applying thermal treatment thereto by executing one or more of operations 13 to 15.

The method ends at 16.

Figure 2:
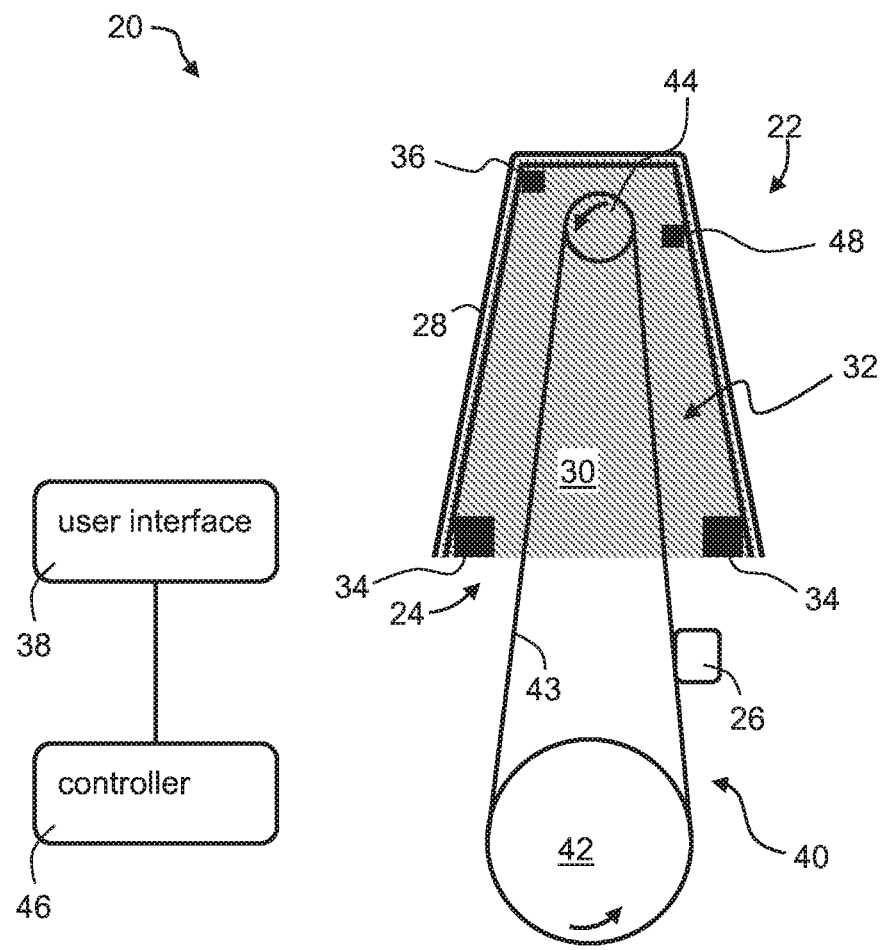
FIG. 2 is a schematic illustration of a system suitable for heating a product, according to some embodiments of the present invention.

Reference is now made to FIG. 2 which is a schematic illustration of a system 20 suitable for heating a product, according to some embodiments of the present invention. System 20 is useful, for example, for executing method 10.

System 20 comprises a vessel 22 having an opening 24, the size of which being sufficiently large for receiving a product 26. Vessel 22 has walls 28 surrounding vessel 22 at all sides except at opening 24. The interior 30 of vessel 22 is filled with a fluid 32. Fluid 32 can be gas (e.g., air, oxygen, helium) or liquid (e.g., water, aqueous solution, oil). Preferably, the fluid is selected so as not to damage product 26.

Embodiments in which fluid 32 is liquid are useful in a liquid environment, wherein product 26 is immersed in liquid. In these embodiments, at least opening 24 of vessel 22 is also immersed in the liquid of the environment so that product 26 remains submerged under the liquid surface of the environment during the entire thermal treatment process. Embodiments in which fluid 32 is gas are useful both in liquid environments and in gaseous environments.

In some embodiments of the present invention system 20 comprises a heating device 34 configured for heating fluid 32 to a temperature that is higher than a temperature outside the vessel. Heating device 34 can be of any type, including, without limitation, a flame based heating device, a resistive heating device (e.g., a filament resistor, a power resistor, a coil), a radiative heating device (e.g., a light source that directs radiation to fluid 32 at a wavelength that heats the material, for example, the light source can apply infrared radiation). Optionally, system 20 also comprises a temperature sensor 36 positioned inside vessel 22 for measuring the temperature of fluid 32 and transmitting the measured temperature to a user interface 38 and/or a controller 46.

Figure 3:
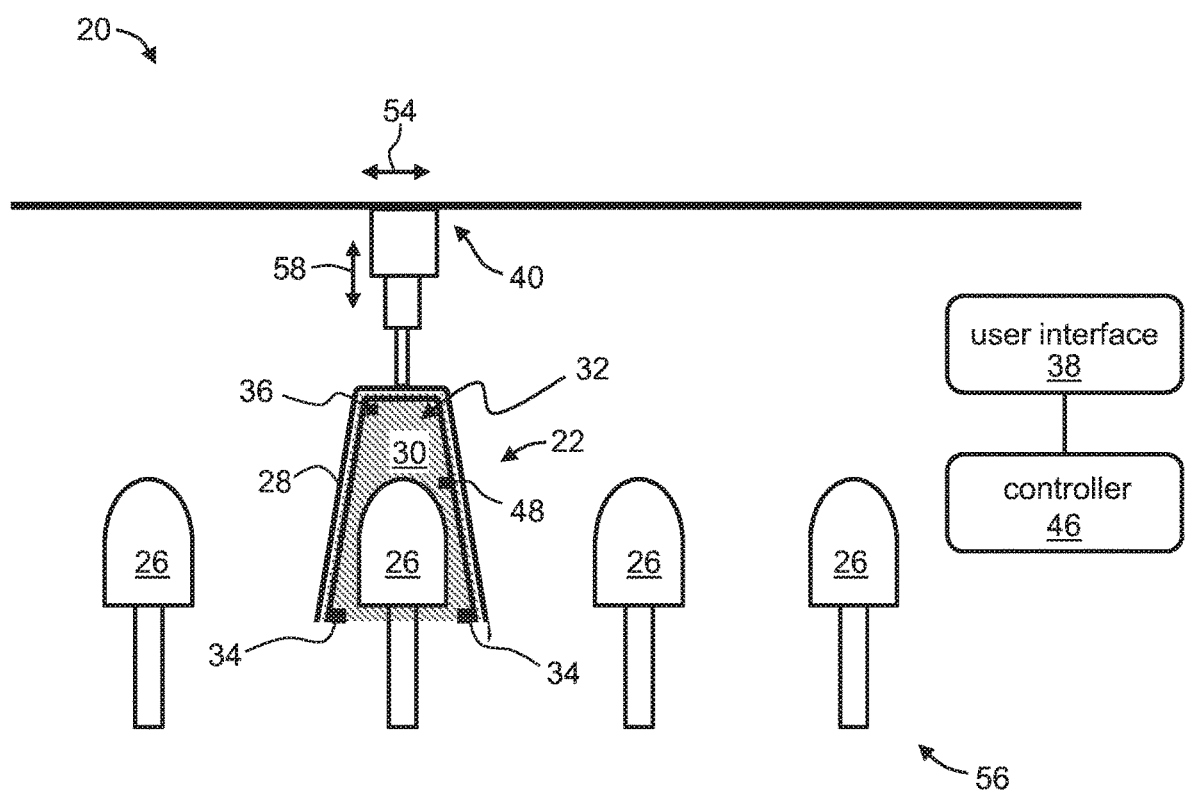
FIG. 3 is a schematic illustration of a system suitable for heating a product, in embodiments of the invention in which a product to be heated is static.

System 20 can further comprise a conveyor 40 configured for conveying vessel 22 and/or product 26 to ensure that product 26 enters interior 30 through opening 24, while vessel 22 is oriented with opening facing downwards. In the schematic illustration of FIG. 2, which is not to be considered as limiting, conveyor 36 is illustrated as a belt or chain conveyor, having a head pulley 42, a tail pulley 44 and a belt or chain 43. Rotational motion of pulleys 42 and 44 results in a motion of belt or chain 43 inside and outside interior 30. However, this need not necessarily be the case since the present embodiments contemplate any other type of conveyor, such as, but not limited to, a roller conveyor, a chain conveyor, a telescopic arm, a robotic arm and the like. A representative example of a conveyor based on a telescopic arm is illustrated in FIG. 3 described below.

Conveyor 40 can be controlled by a controller 46 that is optionally operated by user interface 38. Controller 46 can also control (for example, activate and deactivate) heating device 34. For example, controller 46 can synchronize activation and deactivation of heating device 34 with the operation of conveyor 40. In some embodiments of the present invention system 20 also comprises a sensor 48 that senses the presence or absence of product 26 in the interior 30 of vessel 22 and transmits signal pertaining to this presence or absence to user interface and/or controller 46. Sensor 48 can be, for example, a proximity sensor (e.g., optical proximity sensor), a motion sensor (e.g., optical motion sensor) or the like. Controller 46 can receives the signals from sensor 48 and activate and deactivate heating device 34 responsively to the existence or absence of product 26 in the interior 30 of vessel 22.

While FIG. 2 illustrates system 20 in a configuration in which product 26 moves upwards into vessel 22, this need not necessarily be the case since in some embodiments product 26 is static and conveyor 40 is configured to move vessel 22 downwards. A representative illustration of such configuration is shown in FIG. 3. Shown in FIG. 3 is a collection 56 of products 26 (illustrated as a tree line in the present example). Conveyor 40 is illustrated as a telescopic arm 50 mounted on a rail 52, wherein vessel 22 is mounted on arm 50. Arm 50 is configured to move horizontally 54 along rail 52, and also to retract and extend vertically 58. In response to signals from controller 46, arm 50 moves horizontally above collection 56, preferably while arm 50 is in its retracted state. When vessel 22 is above a particular product 26 in collection 56, arm 50 ceases the horizontal motion and begin to extend until product 26 or a portion thereof (the foliage of the tree in the present example) is within the interior 30 of vessel 22.

Figure 4:
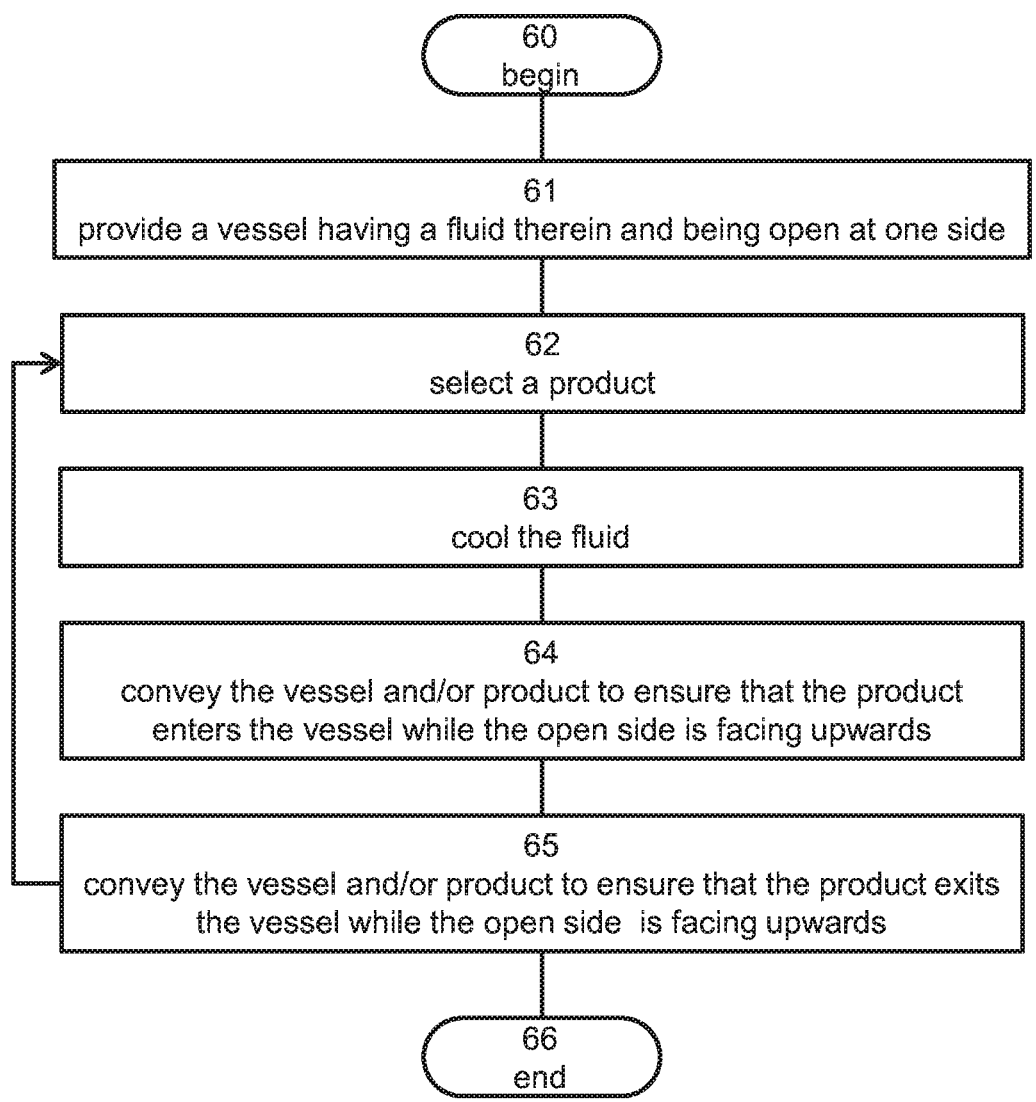
FIG. 4 is a flowchart diagram of a method suitable for cooling a product, according to some embodiments of the present invention.

FIG. 4 is a flowchart diagram of a method suitable for cooling a product, according to some embodiments of the present invention. The product can be of any type that requires cooling. Optionally, the product is an agricultural product, as further detailed hereinabove. The product can also be a food product or industrial product as further detailed hereinabove.

The method begins at 60 and continues to 61 at which a vessel is provided. The vessel can contain a fluid therein. The vessel can be similar to the vessel described above with respect to method 10 and system 20. At 62 a product is selected. Typically, but not necessarily, the product is one of a collection of products to which thermal treatment is to be applied.

Unlike method 10 above, the specific gravity of the fluid in the vessel is preferably higher than the specific gravity of the medium surrounding the walls of the vessel outside the vessel. For example, the fluid in the vessel can be at a temperature that is lower than the temperature outside vessel. Alternatively or additionally, the method can optionally and preferably cool the fluid in the vessel at 63. Preferably, the fluid is cooled while the opening is facing upwards. This is energetically advantageous because the cooled fluid moves downwards, so that when the opening is facing upwards, the cooled fluid is heavier than the environment and therefore does not transfer energy to the environment through a convection process. The fluid can be different from the fluid of the environment surrounding the vessel. For example, when the fluid of the environment surrounding the vessel is water vapor, the fluid in the vessel can be air. Another example is when the fluid of the environment surrounding the vessel is gas, and the fluid in the vessel is liquid.

The method optionally and preferably continues to 64 at which the vessel and/or product is conveyed to ensure that the product enters the interior of the vessel through the opening, while the vessel is oriented with the opening facing upwards. Maintaining the orientation such that the opening is facing up is advantageous because it reduces loss of heat to the environment. Specifically, when the opening is facing upwards, fluid having a temperature that is lower than the environment is prevented from exiting the vessel through the opening.

Operation 64 can be executed manually, or, more preferably using an automatic conveyor, as further detailed hereinbelow. The product can enter the vessel while being static, in which case the vessel is moved upwards to cover the product. These embodiments are particularly useful when it is difficult to convey the product itself, as further detailed hereinabove. Alternatively, the vessel can be static, in which case the product is moved downwards into the interior of the vessel. These embodiments are particularly useful when the product is movable, as further detailed hereinabove. Also contemplated, are embodiments in which both the vessel and the product are conveyed towards each other.

While the product is in contact with the fluid in the interior of the vessel, the product releases heat to the fluid. As a result, the fluid may be heated. In some embodiments, the cooling 63 is continued while the product is in the vessel, so as to prevent or reduce the heating of the fluid. Alternatively, cooling 63 may be applied only after the product has entered the vessel, in which case 64 precedes 63.

The method optionally and preferably continues to 65 at which the vessel and/or product is conveyed to ensure that the product exits the interior of the vessel through the opening, while the vessel is oriented with the opening facing upwards. Operations 65 and 64 are preferably executed using the same technique. Specifically, when the vessel is static at 64 it is also static at 65, and when the product is static at 64 it is also static at 65.

From 65 the method can optionally and preferably loop back to 62 for selecting another product from the collection and applying thermal treatment thereto by executing one or more of operations 63 to 65.

The method ends at 66.

Figure 5:
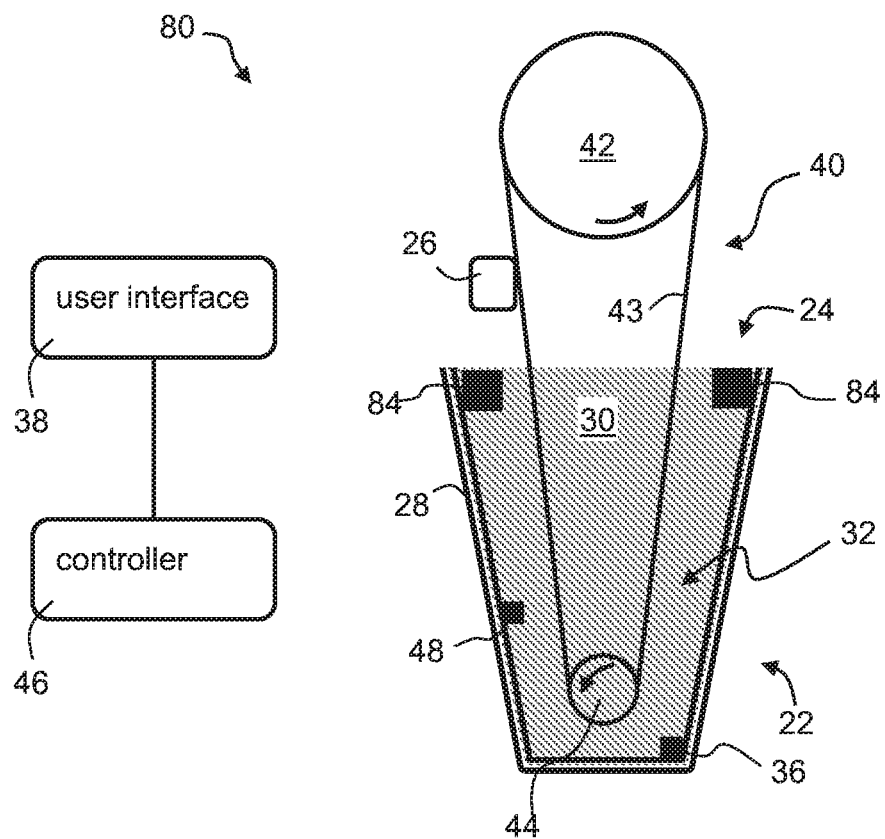
FIG. 5 is a schematic illustration of a system suitable for cooling a product, according to some embodiments of the present invention.

Reference is now made to FIG. 5 which is a schematic illustration of a system 80 suitable for cooling a product, according to some embodiments of the present invention. System 80 is similar to system 20 above, except that some of its components are adapted for executing method 60.

System 80 comprises vessel 22 with opening 24 and walls 28 as further detailed hereinabove. The interior 30 of vessel 22 is filled with a fluid 32, which can be gas or liquid as further detailed hereinabove. Preferably, the fluid is selected so as not to damage product 26.

In some embodiments of the present invention system 60 comprises a cooling device 84 configured for cooling fluid 32 to a temperature that is lower than a temperature outside the vessel. Cooling device 84 can be of any type, including, without limitation, a tube having a coolant flowing therein, a thermoelectric cooling device and the like. Optionally, system 80 also comprises temperature sensor 36 positioned inside vessel 22 for measuring the temperature of fluid 32 and transmitting the measured temperature to user interface 38 and/or controller 46.

System 80 can further comprise conveyor 40 configured for conveying vessel 22 and/or product 26 to ensure that product 26 enters interior 30 through opening 24, while vessel 22 is oriented with opening facing upwards. In the schematic illustration of FIG. 5, which is not to be considered as limiting, conveyor 40 is illustrated as a belt or chain conveyor, but any other type of conveyor can be employed as further detailed hereinabove.

Conveyor 40 can be controlled by controller 46 that is optionally operated by user interface 38, as further detailed hereinabove with respect to system 20. Controller 46 can also control (for example, activate and deactivate) cooling device 84. For example, controller 46 can synchronize activation and deactivation of cooling device 84 with the operation of conveyor 40. In some embodiments of the present invention system 80 also comprises sensor 48 that senses the presence or absence of product 26 in the interior 30 of vessel 22 as further detailed hereinabove. Controller 46 can receives the signals from sensor 48 and activate and deactivate cooling device 84 responsively to the existence or absence of product 26 in the interior 30 of vessel 22.

Figure 6:
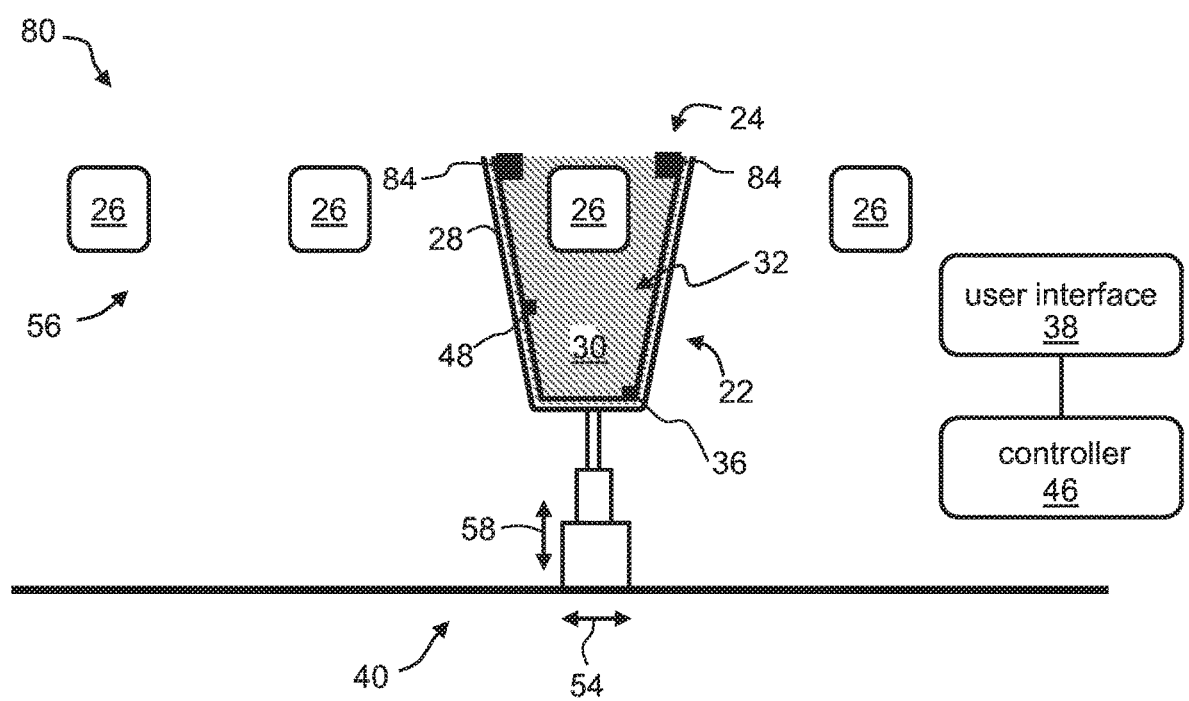
FIG. 6 is a schematic illustration of a system suitable for cooling a product, in embodiments of the invention in which a product to be heated is static.

While FIG. 5 illustrates system 80 in a configuration in which product 26 moves downwards into vessel 22, this need not necessarily be the case since in some embodiments product 26 is static and conveyor 40 is configured to move vessel 22 upwards. A representative illustration of such configuration is shown in FIG. 6. Shown in FIG. 6 is a collection 56 of products 26. Conveyor 40 is illustrated as a telescopic arm 50 mounted on a rail 52, as further detailed hereinabove. In response to signals from controller 46, arm 50 moves horizontally below collection 56, preferably while arm 50 is in its retracted state. When vessel 22 is below a particular product 26 in collection 56, arm 50 ceases the horizontal motion and begin to extend until product 26 or a portion thereof (the foliage of the tree in the present example) is within the interior 30 of vessel 22.

Figure 7:
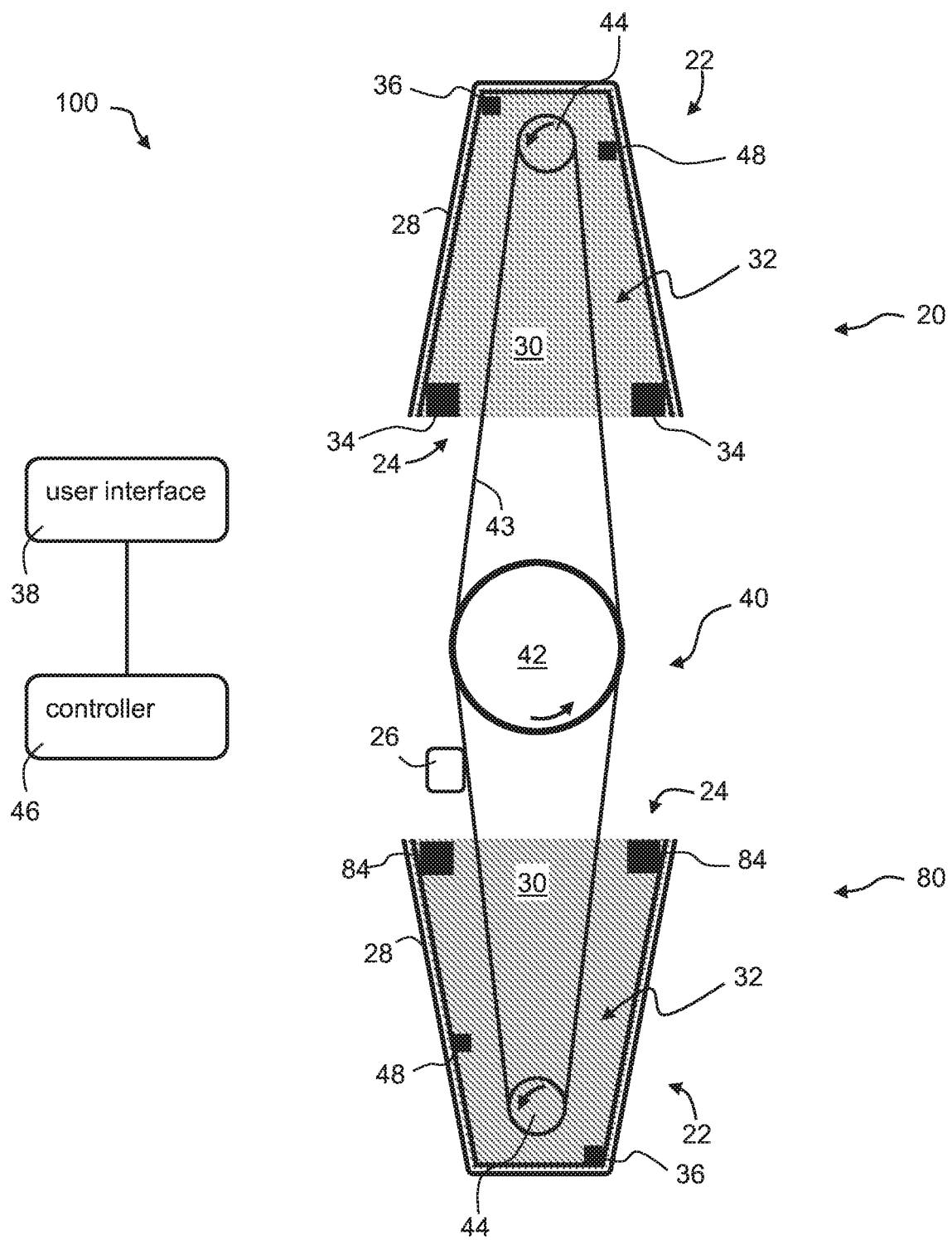
FIG. 7 is a schematic illustration of a system suitable for cooling and heating a product, according to some embodiments of the present invention.
Figure 8:
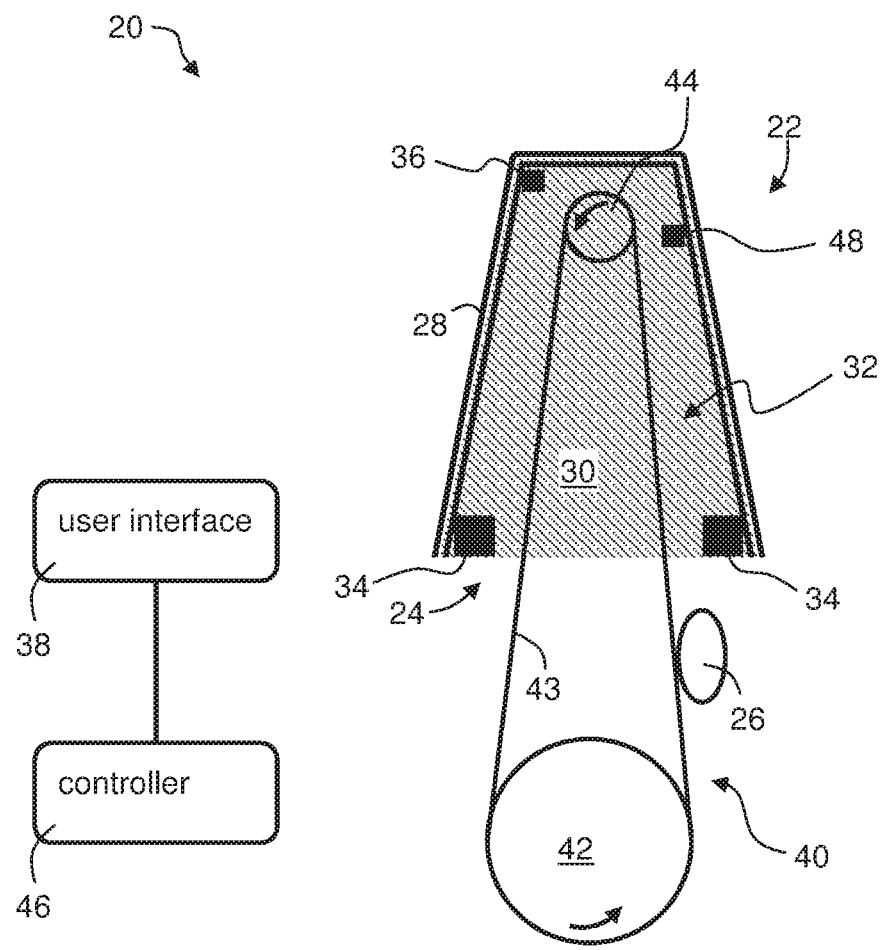
FIG. 8 is a schematic illustration of the system shown in FIG. 2 in an embodiment of the invention in which the product is a poultry egg.

Reference is now made to FIG. 7 which is a schematic illustration of a system 100 suitable for cooling and heating a product, according to some embodiments of the present invention. System 100 combines components from systems 20 and 80 above. Specifically, system 100 comprises both a vessel in which the opening is facing downwards and a vessel in which the opening is facing upwards. In these embodiments, conveyor 40 is configured for conveying the vessels and/or product to ensure that the product enters a first vessel for a first treatment (for example, heating when the first vessel is with the opening facing downwards), exits the first vessel, enters a second vessel for a second treatment (for example, cooling when the second vessel is with the opening facing upwards), and optionally exit the second vessel. In the schematic illustration of FIG. 7, which is not to be considered as limiting, conveyor 40 is illustrated as a belt or chain conveyor, but this need not necessarily be the case since the present embodiments contemplate any other type of conveyor, as further detailed hereinabove.

In any of the above embodiments, the product and/or vessel are conveyed to maintain a relative motion between the product and the vessel, at least during the presence of the product is in the vessel. For example, the conveyor 40 can be controlled by controller 46 such that while the product is in the vessel, the conveyor maintains its motion.

In any of the above embodiments, vessel 22 optionally has a tapered shape (for example, a frustum, e.g., a conical frustum), wherein opening 24 is at a wider side of the tapered shape.

In any of the above embodiments, walls 28 are made of a material having a heat conductivity at room temperature of less than 1 or less than 0.5 or less than 0.25 or less than 0.1 or less than 0.05 watt per meter per degree, so as to provide thermal insulation. Representative examples of materials for use in the walls of the vessel including, without limitation, fiberglass, cork and polyester. Other materials are also contemplated.

In any of the above embodiments, at least one of: the speed of the relative motion between the product and the vessel, and the length of the relative motion path traversed by the product within the vessel is selected so as to ensure that the product is within the vessel for a predetermined time period. The predetermined time period can also be set based on the temperature difference between the fluid in the vessel and the environmental temperature outside the vessel or the temperature of the product. Typically, but not necessarily, for higher temperature differences, shorter time periods are employed. As a representative example, when the product is a poultry egg, the temperature in vessel 22 of system 20 can be from about 70° C. to about 120° C. and the predetermined time period can be from about 0.5 minute to about 2 minutes. Another example is the heating of deciduous trees during or at the end of their hibernation cycle, wherein heating to higher temperatures may shorten the treatment time and improve the efficiency.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of treating an agricultural product, comprising:
providing a vessel having an opening sized for receiving said agricultural product and walls surrounding said vessel at all sides except said opening, such that said opening is opened to a fluid medium surrounding said walls outside said vessel, wherein an interior of said vessel is filled with water vapor having a specific gravity lower than a specific gravity of said medium surrounding said walls outside said vessel, and wherein said water vapor is at a temperature higher than a temperature outside said vessel; and
while said vessel is oriented with said opening facing downwards, conveying said vessel and/or said agricultural product to ensure that said agricultural product enters said interior through said opening, so as to heat said product by said water vapor.

2. The method according to claim 1, wherein said agricultural product is a poultry egg, and said temperature of said water vapor is from about 70° C. to about 120° C.

3. The method according to claim 1, further comprising heating said water vapor before said product is introduced into said vessel.

4. The method of claim 3, wherein said heating is while said opening is facing downwards.

5. The method according to claim 1, further comprising heating said water vapor while said product is in said vessel.

6. The method according to claim 1, further comprising while said vessel is oriented with said opening facing downwards, conveying said vessel and/or said product to ensure that said product exits said interior through said opening.

7. The method according to claim 1, wherein said vessel is static and said product is moved upwards into said interior.

8. The method according to claim 1, wherein said product is static and said vessel is moved downwards to cover said product.

9. A system for heating a product, comprising:
a vessel having an opening sized for receiving said product and walls surrounding said vessel at all sides except said opening, wherein an interior of said vessel is filled with a water vapor;
a heating device configured for heating said water vapor to a temperature higher than a temperature outside said vessel; and
a conveyor configured for conveying said vessel and/or said product to ensure that said product enters said interior through said opening, while said vessel is oriented with said opening facing downwards.

10. The system according to claim 9, wherein said conveyor is also configured for conveying said vessel and/or said product to ensure that said product exits said interior through said opening, while said vessel is still oriented with said opening facing downwards.

11. The system according to claim 9, wherein said vessel is static and said product is moved upwards into said interior.

12. The system according to claim 9, wherein said product is static and said vessel is moved downwards to cover said product.

* * * * *